United States Patent
Spindler et al.

(10) Patent No.: US 11,081,951 B2
(45) Date of Patent: Aug. 3, 2021

(54) LOCATION OF A SECONDARY PART DURING USE IN A LINEAR-MOTOR-BASED SYSTEM

(71) Applicant: Siemens Aktiengesellschaft, Munich (DE)

(72) Inventors: Carsten Spindler, Remptendorf (DE); Bernd Wedel, Moehrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 486 days.

(21) Appl. No.: 16/032,512

(22) Filed: Jul. 11, 2018

(65) Prior Publication Data
US 2019/0020256 A1    Jan. 17, 2019

(30) Foreign Application Priority Data

Jul. 13, 2017   (EP) .................................... 17181217

(51) Int. Cl.
*H02K 11/225*   (2016.01)
*H02K 41/03*   (2006.01)
(Continued)

(52) U.S. Cl.
CPC ........... *H02K 41/03* (2013.01); *H02K 11/215* (2016.01); *H02K 11/225* (2016.01); *H02K 29/08* (2013.01);
(Continued)

(58) Field of Classification Search
CPC ...... H02K 41/031; H02K 41/03; H02K 29/08; H02K 11/225; H02K 11/20;
(Continued)

(56) References Cited

U.S. PATENT DOCUMENTS

| 7,786,685 B2 | 8/2010 | Schueren |
| 2005/0046281 A1 | 3/2005 | Sugita et al. |

(Continued)

FOREIGN PATENT DOCUMENTS

| CN | 1592051 | 3/2005 |
| DE | 102006036288 | 2/2008 |

(Continued)

OTHER PUBLICATIONS

Nondahl Thomas A et al: "A Permanent-Magnet Rotor Containing an Electrical Winding to Improve Detection of Rotor Angular Position", IEEE Transactions on Industry Applications, IEEE Service Center, Piscataway, NJ, US, vol. 35, No. 4, , XP011022614, ISSN: 0093-9994, pp. 823-824; 1999.

(Continued)

*Primary Examiner* — Bryan R Perez
(74) *Attorney, Agent, or Firm* — Cozen O'Connor

(57) ABSTRACT

A method for locating a secondary part during use in a linear-motor-based system, wherein at least one primary part includes primary-part coils and is provided in the linear-motor-based system, the secondary part has a magnetic active part and the primary-part coils can be actuated via a drive current to achieve an advance of the secondary part, for locating the secondary part, the at least one primary part is energized via a primary current at a test frequency to induce a secondary current in at least one secondary-part winding provided on the secondary part and respective current responses of the primary-part coils are measured, where measured current changes in the current responses indicate the change in the inductance of the respective primary-part coil and a relative position of a secondary part to the respective primary-part coil.

19 Claims, 2 Drawing Sheets

(51) Int. Cl.
*H02K 11/215* (2016.01)
*H02K 29/08* (2006.01)

(52) U.S. Cl.
CPC ....... *H02K 41/031* (2013.01); *H02K 2201/15* (2013.01); *H02K 2201/18* (2013.01)

(58) Field of Classification Search
CPC ............. H02K 11/0094; H02K 11/215; H02K 2201/15; H02K 2201/18
See application file for complete search history.

(56) References Cited

U.S. PATENT DOCUMENTS

| | | | | |
|---|---|---|---|---|
| 2005/0062356 | A1* | 3/2005 | Hoppe | H02K 41/031 310/183 |
| 2009/0261765 | A1* | 10/2009 | Stoiber | H02P 6/182 318/400.33 |
| 2009/0315505 | A1* | 12/2009 | Denk | H02K 41/031 318/718 |
| 2010/0185320 | A1 | 7/2010 | Nemeth-Csoka et al. | |

FOREIGN PATENT DOCUMENTS

| | | |
|---|---|---|
| DE | 102006036289 | 2/2008 |
| DE | 102008008602 | 12/2008 |
| DE | 102015223815 | 6/2017 |
| WO | WO2006/100057 | 9/2006 |
| WO | WO2017/089182 | 6/2017 |

OTHER PUBLICATIONS

Office Action dated Dec. 18, 2019 issued in Chinese Patent Application No. 201810712126.X.

Nondahl et al., "A Permanent Magnet Rotor Containing an Electrical Winding to Improve Detection of Rotor Angular Position", Sep. 1, 1999, pp. 359-363.

* cited by examiner

LOCATION OF A SECONDARY PART DURING USE IN A LINEAR-MOTOR-BASED SYSTEM

BACKGROUND OF THE INVENTION

1. Field of the Invention

The invention relates to a linear-motor-based system and to a method for locating a secondary part during use in the linear-motor-based system.

2. Description of the Related Art

Linear-motor-based systems are used in industrial fields, such as to move secondary parts, which are fitted in a movable manner on a transport system, in a controlled or regulated manner with the aid of linear motor technology. The secondary parts, sometimes also referred to as rotors, can convey, for example, components or piece goods between processing stations in a production plant or within a processing station, for example. Machine tools or other machines can also use linear motors as a drive and have secondary parts for this. Secondary parts can also be used as workpiece carriers or can be coupled to workpiece carriers, which transport workpieces in a plant. Here, the secondary parts are moved in a highly precise manner, for example as "carriers", along a primary part with the aid of windings or coils provided in the primary part. Multi-carrier systems (MCS) in which a plurality of carriers are provided on a long stator and can be moved independently of one another via appropriate actuation of the coils are known.

In order to be able to match the carriers to one another in an optimum manner, for example to prevent collisions or to enable matching with other components of the plant, in particular continuing conveyor belts or robot gripping arms or similar, position sensors can be fitted to a carrier. This is associated with a relatively high level of technical outlay on the primary part. Sensors and corresponding cabling must be fitted and the sensor evaluation system must be configured. The carrier also has to be configured specifically for the position sensor system of the plant. Assigning a sensor to the primary parts requires a relatively high level of software outlay because one carrier is operated by a plurality of primary parts. In MCS applications, the carriers often move over a plurality of primary parts, which are referred to as segments.

To prevent this outlay, secondary parts in linear-motor-based systems are often operated purely in a controlled manner. In this case, it is necessary to accept disadvantages such as low positional accuracy or low speed accuracy, as well as low possible dynamics and thus lower speeds and accelerations.

SUMMARY OF THE INVENTION

In view of the foregoing, is an object of the present invention to provide a method for simplifying location of a secondary part during use in a linear drive.

This and other objects and advantages are achieved in accordance with the invention by a method for locating (i.e., positioning) a secondary part during use in a linear-motor-based system, wherein at least one primary part having primary-part coils is provided in the linear-motor-based system, wherein the secondary part has a magnetic active part for forming a secondary-part magnetic field and the primary-part coils can be actuated using a drive current such that a primary-part magnetic field forms to achieve an advance of the secondary part, and where at least one secondary-part winding is provided on the secondary part and induction of a secondary current in the secondary-part winding at a test frequency causes a change in the inductance of a primary-part coil situated in spatial proximity to the secondary part.

For the purpose of locating the secondary part, the at least one primary part is energized using a primary current at the test frequency to induce the secondary current and respective current responses of the primary-part coils are measured, where measured current changes in the current responses indicate the change in the inductance of the respective primary-part coil and a relative position of a secondary part to the respective primary-part coil.

In context of the present invention, a primary part is understood to mean an active part or a plurality of active parts of a linear motor. It may be a long stator that is involved, along which secondary parts are moved and which is itself installed in a stationary manner. Individual energization of the coils generates a traveling magnetic field along the primary part, the primary-part magnetic field, which causes a movement of the secondary part along the primary part. The secondary part has a magnetic active part, such as a permanent magnet, which experiences an advancing force due to the traveling magnetic field of the primary part. In this case, the secondary-part magnetic field formed by the magnetic active part interacts with the primary-part magnetic field, with the result that an advancing force is produced, which causes the advancing of the secondary part, such as in a horizontal direction along a horizontally fixed long stator.

In the context of the present invention, a linear drive is understood to mean a drive system in which linear motors are used for driving. The drive current is understood to mean current that is used to energize the primary-part coils for generating the traveling magnetic field and that is responsible, for example, for the movement of the carriers along the stator. It may be a linear drive with single-coil technology having a corresponding primary part or a drive based on three-phase current having segments that are strung together.

In a "multi-carrier system", the primary-part coils of a long stator are assigned drive currents such that a plurality of carriers can be moved along the stator independently of one another.

A primary part comprises, for example, a multiplicity of coils, in particular, integer multiples of three in the case of three-phase energization.

In the event of a plurality of secondary parts, at least one secondary-part winding is provided in each case on a secondary part or on at least one secondary part. The secondary-part winding is advantageously configured as single-phase. The secondary-part winding is advantageously fitted in spatial proximity to the permanent magnets of the secondary part, such as around a pole of a magnet. Accordingly, the secondary-part winding moves together with the secondary part along the primary part. The secondary-part winding is provided to induce a secondary current at a test frequency. The known phenomenon of the induction of a secondary current can be observed in the secondary-part winding once a primary current causes in a spatially nearby coil a changing magnetic field in the direction of the secondary-part winding axis.

To locate the secondary part, it is proposed to energize primary-part coils using a primary current at a selected test frequency. This induces a secondary current at the test frequency in the secondary-part winding. The secondary current in the secondary-part winding causes a change in the inductance of a primary-part coil situated in spatial proximity to the secondary part. This change in inductance has an effect on the current response of the primary-part coil concerned. If such a current change is measured in the current response of a primary-part coil, this can be attributed to the change in the inductance of the respective primary-part coil and the spatial proximity of a secondary part to the primary-part coil can therefore be identified. The secondary-part winding could also be referred to as a locating winding.

The energization at the test frequency is performed in a defined direction, which is matched to the orientation of the secondary-part winding, so that the secondary current can be induced.

The method is also applicable to linear-motor-based systems with single-coil technology or without segments. The primary part then has, in particular, different windings, those that are required for drive energization over the system and at the same time those required for the locating energization.

In one embodiment, a plurality of, in particular two or four, secondary-part windings are provided for each secondary part. In the case of a secondary part having a plurality of poles, one secondary-part winding is provided for each pole, for example. The plurality of secondary-part windings can form separate windings. A single secondary-part winding can likewise extend over a plurality of poles and can be connected in a meandering shape to form a "wave winding".

By monitoring the currents in the primary-part coils, it is advantageously possible to identify whether a change in the inductance in the respective primary-part coil can be identified. It is therefore possible to infer the presence of a secondary current that has to be present in a spatially nearby winding. It is thus possible to infer the proximity of a secondary part with an associated secondary-part winding. The effect of the impact of the current in the primary-part coil due to the change in a secondary current in the secondary-part winding, which itself has been induced by the application of the primary current at the test frequency in the primary-part coil, advantageously makes the proposed method for locating the secondary part possible without a position sensor.

It is advantageously possible to implement sensorless regulation of synchronous motors, in particular permanent-magnet synchronous motors, switched reluctance motors or "interior permanent magnet synchronous motors" with the aid of the proposed test-signal-based method.

In the context of the present invention, the test frequency is understood to mean a frequency that is used specifically for the locating energization and that is prescribed or can be prescribed depending on the selected configuration or case of application or depending on the selected components. The behavior of the secondary-part winding or of a circuit in which the secondary-part winding is integrated is adapted depending on the selected state of the secondary-part winding. For example, the converter prescribes a usable frequency, which forms the test signal frequency. If the energization is performed at the test frequency, the induction of the secondary current is also performed approximately at the test frequency.

In accordance with one embodiment, a winding axis of the secondary-part winding is provided at least partially, in particular completely, in a d-axis prescribed by the magnetic active part. In a particularly advantageous embodiment, the secondary-part winding is provided completely in the direction of the d-axis or the main flux direction of the secondary-part magnetic field. The secondary-part winding is then arranged, in particular, such that the winding is involved in the flux generated by the permanent magnets of the secondary part. The permanent magnets of a secondary part form a main flux direction or d-direction or d-axis, which is prescribed by the spatial arrangement of the magnetic active part in the secondary part. The secondary-part winding is fitted such that it can be used in a way that strengthens the field of the main flux direction or that weakens the field of the main flux direction. In a particularly advantageous embodiment, the secondary-part winding is fitted completely in the d-direction and the locating energization likewise occurs in the prescribed d-direction alongside the drive energization in the q-direction so that disruption to the advancing force is minimized. An alternating magnetic field with portions in the d-direction prescribed by the permanent magnets influences the advancing movement on account of the drive currents and the magnetic fields required for the advancing force as little as possible.

The position of the flux axis prescribed by the permanent magnets of a secondary part or carrier and amplified by the secondary-part winding is used to determine the position of the carrier.

In another embodiment, for the purpose of location (i.e., positioning), the at least one primary part is energized using a primary current, which leads to an alternating magnetic field with portions, in particular completely, in the direction of a winding axis of the secondary-part winding. The energization is intended to lead to an alternating magnetic field in the direction of the winding axis of the secondary-part winding at least up to a certain portion. The better the direction of the alternating magnetic field and that of the secondary-part winding correspond, the higher the induced current.

This is advantageously achieved for the actuation of the primary-part coils via a separate current controller for the d-direction. The primary-part magnetic field, formed by the drive current, and the secondary-part magnetic field, oriented according to the primary-part magnetic field, are therefore advantageously influenced as little as possible. As a result thereof, the advancing movement of the secondary part is impaired as little as possible. The drive currents and the primary currents are superposed and jointly applied for a primary-part coil. In a particularly advantageous example, the secondary-part winding is formed in the d-direction and the energization using the primary current likewise occurs completely in the d-direction, i.e., primary currents are applied to the primary-part coils such that an alternating magnetic field leads only in the direction of the winding axis of the secondary-part winding. This maximizes, on the one hand, the impact of the secondary current on the change in the inductance of the primary-part coil and simultaneously minimizes the influencing of the primary-part magnetic field by the alternating magnetic field of the primary current.

In one embodiment, the primary-part coils are energized using a primary current at the test frequency >1 kHz, in particular 2 kHz or 4 kHz. The higher the test signal frequency, the higher the achievable "sensor frequency" of the sensor signal resulting from the test signal. The higher the sensor frequency, the higher the achievable regulator dynamics, but at the same time the more complex the implementation of the test signal method. The test frequency is prescribed by the converter and in particular a plurality of possible stator coils are supplied at this test frequency by the converter to generate the required secondary current in the secondary-part winding, which can cause the change in inductance.

In accordance with another embodiment, the primary-part coils of the at least one primary part are energized via the primary current, where a secondary part is assumed to be in the spatial proximity of the primary-part coils. The energization of the primary-part coils via the primary current can be operated, for example, such that possible primary-part coils are energized via estimation. For example, it is possible to predict by approximate estimation the region of a plurality of segments in which a secondary part is approximately situated. All of these possible segments are energized using the primary current at the test frequency so that the rest of the segments and the primary coils thereof are not affected by the locating.

In accordance with an embodiment, selected primary-part coils are energized via a primary current at an energy transmission frequency, which primary current leads to an alternating magnetic field, where a voltage is induced in a secondary-part winding situated in spatial proximity to the selected primary-part coils by the alternating magnetic field and the voltage is used to provide energy to one or more loads or energy stores connected to the secondary part of the secondary-part winding situated in spatial proximity.

In addition to the location via energization at a locating frequency, energization at an energy transmission frequency thus occurs at the same time or in alternation. The locating frequency has, for example, in comparison to the energy transmission frequency, a relatively high frequency and is, for example, matched to a resonant frequency of a resonant circuit in which the secondary-part winding is integrated.

The secondary-part winding then also has, as well as the function of a locating winding, the function of an energy transmission winding. The two functions are actuated via different frequencies in order to be disjoint. An implementation via a load having a capacitive portion can advantageously be performed. A circuit in which the secondary-part winding is installed is then accordingly configured for the two functions.

It is also an object of the invention to provide a linear-motor-based system having at least one primary part having primary-part coils, and at least one secondary part having a magnetic active part for forming a secondary-part magnetic field and at least one secondary-part winding, where the at least one primary part can be actuated using a drive current such that a primary-part magnetic field forms so as to achieve an advance of the at least one secondary part along the at least one primary part, where an induction of a secondary current in the secondary-part winding at a test frequency causes a change in the inductance of a primary-part coil situated in spatial proximity to the secondary part, a control unit for energizing the at least one primary part using a primary current at the test frequency to induce the secondary current, and a measuring device for measuring respective current responses of the primary-part coils, where measured current changes in the current responses indicate the change in the inductance of the respective primary-part coil and a relative position of the secondary part to the respective primary-part coil.

The current responses are measured, in particular, by a converter, which actuates the respective primary-part coil. For an embodiment with a three-phase motor, the converter measures the current in two or three phases of the applied current and obtains the d-proportion after transformation from the u/v/w coordinate system via the alpha/beta coordinate system to the d/q coordinate system.

In accordance with an embodiment, the secondary-part winding is arranged at least partially, in particular completely, in a d-axis prescribed by the magnetic active part.

In accordance with an embodiment, the secondary-part winding is embedded within the magnetic active part. For example, the winding is formed around the permanent magnet of the secondary part.

In accordance with an embodiment, the secondary-part winding is provided in a manner spatially, in particular laterally, offset to the magnetic active part. Although the secondary-part winding is therefore within the secondary part, it is implemented without mechanical dependency between the magnetic active part of the secondary part, in particular a secondary-part permanent magnet, and the locating winding. The spatial offset is possible in all three spatial dimensions, i.e., in front, behind, next to, above or below the permanent magnets.

In accordance with another embodiment, the control unit is configured to energize the at least one primary part using a primary current, which leads to an alternating magnetic field with portions, in particular completely, in the direction of a winding axis of the secondary-part winding.

In one embodiment, the control unit is configured to energize the primary-part coils using a primary current at the test frequency magnitude of 1 kHz, in particular 2 kHz or 4 kHz. For this, the control unit interacts, in particular, with a converter control unit or is composed of converter control units.

In accordance with another embodiment, the secondary-part winding is connected to form a series resonant circuit or a resonant circuit or is shorted. The secondary-part winding can be shorted. As an alternative, the secondary-part winding can be integrated into a resonant circuit or a series resonant circuit. The resonant frequencies of such arrangements are then matched to the test signal frequency such that a particularly significant effect on the change in the inductance in the primary-part coil can be achieved.

In accordance with yet another embodiment, a plurality of secondary-part windings are provided for each secondary part.

In accordance with yet another embodiment, one or more secondary-part windings are guided around one or more poles of the secondary part.

In accordance with yet another embodiment, the linear-motor-based system has a plurality of consecutive segments. These consecutive segments are, in particular, segments that make the method of the carriers on the segment possible in each case by linear motor technology and at the same time make it possible to transfer the carriers between a plurality of segments or over a plurality of segments by matching the respective converter systems of a segment to one another.

It is advantageously possible with the aid of the present method and linear-motor-based system to determine the position of a carrier or secondary part on a linear-motor-based system with the aid of a test signal method. As a result, the motor can be operated in a field-oriented manner. In the case of energization in the d-direction and orientation of the secondary-part winding in the d-direction, the current induced in the secondary part acts only on the main flux of the secondary part in a strengthening or a weakening manner. The d-direction is usually not used for the drive and the forward movement and can be used in accordance with the present invention for the locating. Ideally, only the inductance of the primary-part coils in the d-direction or the d-inductance is influenced by the self-induction. A secondary part can advantageously be regulated instead of just controlled. As a result, a significantly higher accuracy and dynamics can be achieved and influences by disturbance forces or operating forces or latching forces are substantially corrected.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below with reference to an exemplary embodiment with the aid of the figures, in which.

DETAILED DESCRIPTION OF THE EXEMPLARY EMBODIMENTS

Figure 1:
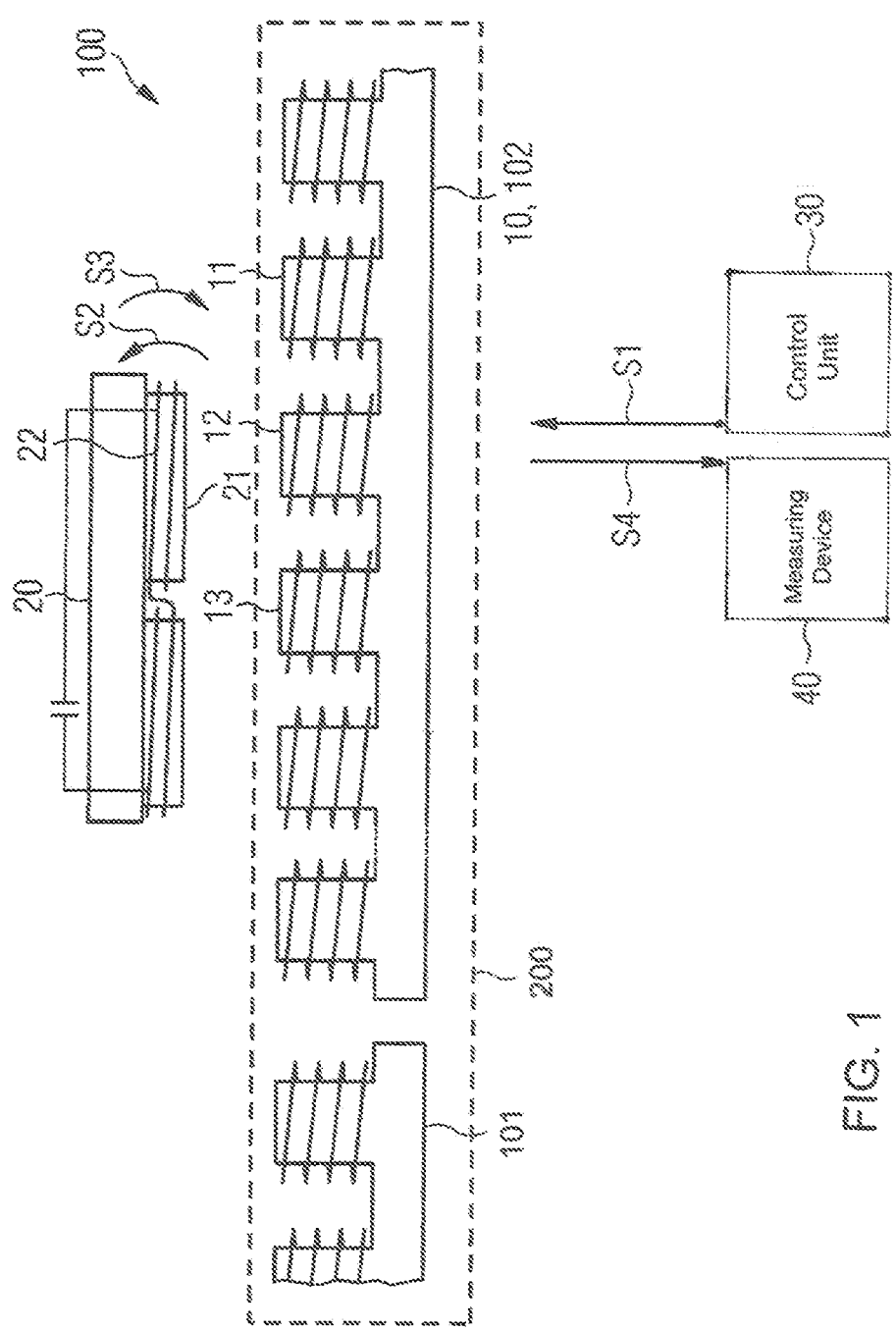
FIG. 1 is a schematic block diagram of a linear-motor-based system in accordance with the invention.

FIG. 1 shows a schematic illustration of a section of a linear-motor-based system 100 having an exemplary secondary part 20 in accordance with an exemplary embodiment of the invention. The linear-motor-based system 100 has a primary part 10 having coils or primary-part coils 11, 12, 13 . . . . The linear-motor-based system 100 consists, for example, of a plurality of segments 101, 102 as primary parts, which are provided with linear motor technology and form a long stator 200. The primary coils 11, 12, 13 . . . of a primary part 10 are supplied with current via the linear motors such that a secondary part 20 having a magnetic active part 21 can be moved in a controlled manner along the long stator 200 within a segment and over a plurality of segments. Here, precise movement is possible due to precise energization of the individual coils. A primary-part magnetic field is formed by the energization of the primary-part coils 11, 12, 13 . . . , which ensures that a secondary-part magnetic field existing around the secondary part 20 due to the magnetic active part 21 attempts to orient itself according to the primary-part magnetic field, as a result of which a force is created along the long stator 200. This force acting on the secondary part 20 can be set in a precise manner such that a movement pattern, including acceleration and stopping processes, which is flexible and can be individually prescribed for a secondary part 20, can be achieved.

The schematic illustration of FIG. 1 shows, by way of example, a secondary part 20 of this kind on a section or segment 101 as primary part 10. Further segments or sections 102 are indicated and can be provided in one implementation example in any desired number one behind the other. A plurality of secondary parts (not depicted here) can also be implemented and can each be moved on a segment 101 and over the different segments 101, 102. FIG. 1 also schematically shows that a secondary-part winding 22 is provided on the secondary part 20, where the secondary-part winding in the described exemplary embodiment is arranged around the magnetic active part 21, such as a permanent magnet. The winding is wound in a meandering shape around the two illustrated poles, has a capacitor and thus forms a resonant circuit.

The primary-part coils 11, 12, 13 . . . can be actuated using a drive current such that the secondary part 20 traces a prescribed movement pattern. In addition to this drive current, a primary current is output by the converter to locate secondary parts of the system. For example, the primary-part coils of a segment are supplied with the primary current. A control unit 30 initiates the energization S1 using the primary current at a test frequency. The test frequency is a suitable test frequency that is prescribed by the converter used and responsible for the energization of the primary-part coils. In the exemplary illustrated embodiment, the secondary-part winding 22 is installed in a resonant circuit, the resonant frequency of which is adjusted to the test frequency. Through the energization S1 of the primary-part coils using the primary current at the test and resonant frequency, a current at the test frequency is induced in the secondary-part winding. In this case, the test frequency is the resonant frequency. As a result, the effect of the induction is increased. The induction S2 of the secondary current in the resonant circuit of the secondary part causes a change in the inductance of a primary-part coil 12 situated in spatial proximity then to the secondary part 20. If there are a plurality of coils situated in spatial proximity, the plurality of coils undergo the change in inductance.

The current responses of the primary-part coils, such as precisely the three coils supplied with the primary locating current, are measured S4 via a measuring device 40 and the change in the inductance of a primary-part coil is perceived as a result. The change in inductance arises S3 due to a secondary-part winding having an induced secondary current situated nearby. If a secondary part 20 is thus above or in direct spatial proximity to a primary-part coil, the secondary part is perceived based on the changed current response of the respective primary-part coil. In the exemplary embodiment, the secondary-part winding is oriented in the d-axis. The energization at the test frequency is likewise performed in the d-direction. The relative position of a d-axis of a secondary part strengthened by the secondary-part winding to a primary-part coil is thus determined. The induction S2 of the secondary current in the resonant circuit of the secondary part causes a change in the inductance of the d-axis in the three-phase primary winding 11, 12, 13 in spatial proximity to the secondary part 20.

The exemplary embodiment shows a secondary-part winding 22, which is oriented in the direction of the d-axis at the location of the poles. Embodiments with a secondary-part winding oriented horizontally or obliquely to the horizontal along the profile of the d-axis in a region between the permanent magnets are also conceivable. The locating energization must occur according to the three-phase-current angle of the three-phase energization prescribed thereby, such that the flux of the permanent magnet at the location of the winding is influenced.

The numbering of the described method steps is not intended to designate a preferred chronological order. Instead, the numbering is intended to illustrate logical relationships. The steps can occur at the same time or in a chronologically offset manner and can last for different amounts of time. In particular, the energization occurs at the resonant frequency as test frequency for the primary current in a manner distributed equally and across all stator coils 11, 12 . . . . In one embodiment, only energization of relevant stator coils occurs, in which a secondary part or rotor is presumed or estimated to be in proximity. A plurality of coils can also be tested in a chronologically offset manner. The current responses are likewise measured, for example, continuously or in a chronologically offset manner and, for example, also equally for all coils or specifically for selected primary-part coils.

The exemplary embodiment described can be used to accomplish sensorless locating of a secondary part, such as a carrier, in a linear-motor-based system, which accordingly advantageously demands the use of carriers without additional sensors, cabling and sensor evaluation devices that would be required for a sensor-based solution, for example.

The proposed solution functions particularly advantageously for cases in which there is a significant difference in the inductances Ld and Lq, i.e., when the induced secondary current arising in the secondary-part winding oriented in the d-direction exerts a significant influence on the inductance Ld of the primary-part winding.

The target position of a secondary part, which is used with a workpiece carrier provided in a production plant, for example, can now be regulated advantageously. In comparison with controlled operation, the accuracy and dynamics are increased and influences such as disturbance or operating forces or latching forces can be substantially corrected thereby.

It is also possible to use the locating method as a second position measuring method in addition to a conventional position measuring method. For example, a non-safety-proficient motor sensor may already be provided and the above-described locating method achieves a safety-proficient overall system in a cost-effective manner. Based on the safety-proficiency of the presently disclosed test-signal-based locating method, a certifiable safety-proficient overall system can be provided.

Figure 2:
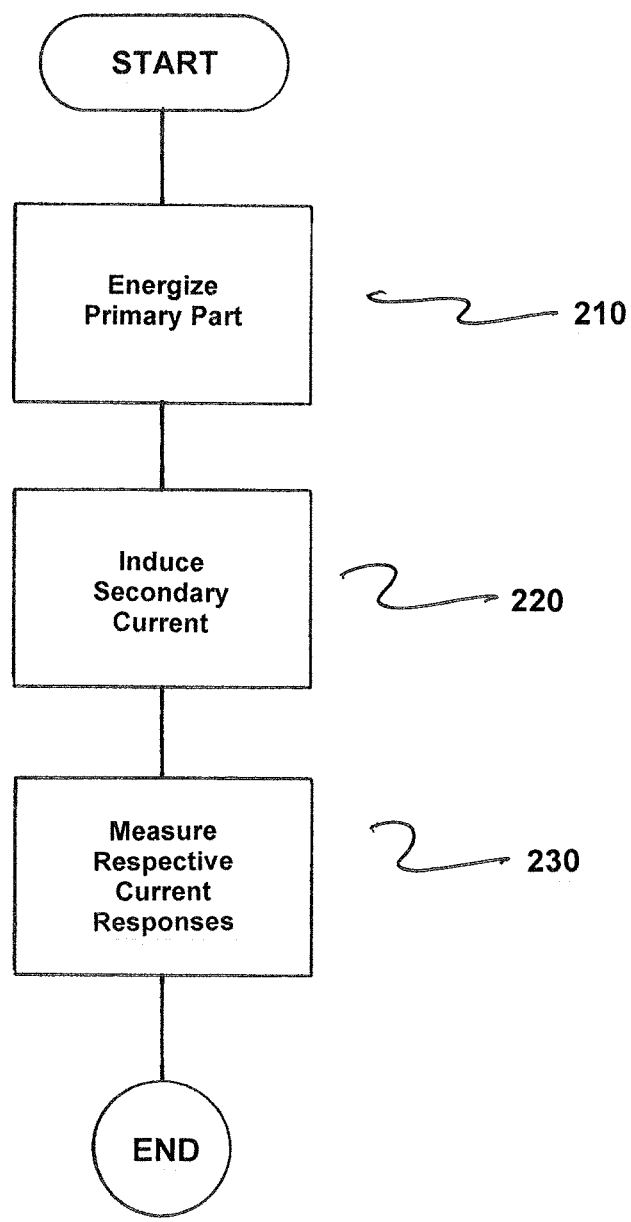
FIG. 2 is a flowchart of the method in accordance with the invention.

FIG. 2 is a flowchart of a method for locating a secondary part during use in a linear-motor-based system, where at least one primary part has primary-part coils provided in the linear-motor-based system, the secondary part has a magnetic active part for forming a secondary-part magnetic field and the at least one primary-part coil can be activated via a drive current such that a primary-part magnetic field forms to achieve an advancement of the secondary part, and where at least one secondary-part winding is provided on the secondary part and an induction of a secondary current in the secondary-part winding at a test frequency causes S3 a change in the inductance of a primary-part coil situated in spatial proximity to the secondary part. The method comprises energizing the at least one primary part via a primary current at the test frequency to locate the secondary part, as indicated in step 210.

Next, the secondary current S2 is induced based on the energized at least one primary part via the primary current at the test frequency, as indicated in step 220.

Respective current responses of the primary-part coils (S4) as now measured, as indicated in step 230.

In accordance with the method of the invention, measured current changes in the current responses indicate the change in the inductance of the respective primary-part coil and a relative position of a secondary part to the respective primary-part coil.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for locating a secondary part during use in a linear-motor-based system, at least one primary part having primary-part coils being provided in the linear-motor-based system, the secondary part having a magnetic active part for forming a secondary-part magnetic field and the at least one primary-part coil is actuatable via a drive current such that a primary-part magnetic field forms to achieve an advancement of the secondary part, at least one secondary-part winding being provided on the secondary part and an induction of a secondary current in the secondary-part winding at a test frequency causing a change in the inductance of a primary-part coil situated in spatial proximity to the secondary part, the method comprising: energizing the at least one primary part via a primary current at the test frequency to locate the secondary part; inducing the secondary current based on the energized at least one primary part via the primary current at the test frequency; and measuring respective current responses of the primary-part coils; wherein measured current changes in the current responses indicate the change in the inductance of the respective primary-part coil and a relative position of a secondary part to the respective primary-part coil; and wherein the primary-part coils of the at least one primary part are energized via the primary current, a secondary part being in the spatial proximity of said primary-part coils.

2. The method as claimed in claim 1, wherein a winding axis of the secondary-part winding is provided at least partially in a d-axis prescribed by the magnetic active part.

3. The method as claimed in claim 2, wherein the winding axis of the secondary-part winding is provided completely in the d-axis prescribed by the magnetic active part.

4. The method as claimed in claim 3, wherein the alternating magnetic field with portions is completely in the direction of the winding axis of the secondary-part winding.

5. The method as claimed in claim 2, wherein, for purposes of the location, the at least one primary part is energized via the primary current, which leads to an alternating magnetic field with portions, in particular completely, in the direction of a winding axis of the secondary-part winding.

6. The method as claimed in claim 1 or 2, wherein, for purposes of the location, the at least one primary part is energized via the primary current, which leads to an alternating magnetic field with portions, in particular completely, in the direction of a winding axis of the secondary-part winding.

7. The method as claimed in claim 1, wherein selected primary-part coils are energized via a primary current at an energy transmission frequency, said primary current leading to an alternating magnetic field; and wherein a voltage is induced in a secondary-part winding situated in spatial proximity to the selected primary-part coils by the alternating magnetic field and the induced voltage is used to provide energy to at least one load or energy stores connected to the secondary part of the secondary-part winding situated in spatial proximity.

8. A linear-motor-based system, comprising: at least one primary part having primary-part coils; at least one secondary part having a magnetic active part for forming a secondary-part magnetic field and having at least one secondary-part winding, the at least one primary part being actuatable via a drive current such a way that a primary-part magnetic field forms to achieve an advancing of the at least one secondary part along the at least one primary part, an induction of a secondary current in the secondary-part winding at a test frequency causing a change in an inductance of a primary-part coil situated in spatial proximity to the secondary part; a control unit for energizing the at least one primary part via a primary current at the test frequency to induce the secondary current; and a measuring device for measuring respective current responses of the primary-part coils, measured current changes in current responses indicating a change in an inductance of a respective primary-part coil and a relative position of the secondary part to the respective primary-part coil; wherein the primary-part coils of the at least one primary part are energized via the primary current, a secondary part being in the spatial proximity of said primary-part coils.

9. The linear-motor-based system as claimed in claim 8, wherein the secondary-part winding is arranged at least partially in a d-axis prescribed by the magnetic active part.

10. The linear-motor-based system as claimed in claim 9, wherein the secondary-part winding is arranged completely in the d-axis prescribed by the magnetic active part.

11. The linear-motor-based system as claimed in claim 9, wherein the secondary-part winding is embedded within the magnetic active part.

12. The linear-motor-based system as claimed in claim 9, wherein the secondary-part winding is spatially offset to the magnetic active part.

13. The linear-motor-based system as claimed in claim 12, wherein the secondary-part winding is laterally offset to the magnetic active part.

14. The linear-motor-based system as claimed in claim 8, wherein the control unit is configured to energize the primary part via the primary current, which leads to an alternating magnetic field at least with portions in a direction of a winding axis of the secondary-part winding.

15. The linear-motor-based system as claimed in claim 14, wherein the alternating magnetic field is completely in the direction of the winding axis of the secondary-part winding.

16. The linear-motor-based system as claimed in claim 8, wherein the secondary-part winding is one of (i) integrated into a series resonant circuit or a resonant circuit and (ii) shorted.

17. The linear-motor-based system as claimed in claim 8, wherein each secondary part includes a plurality of secondary-part windings are provided for.

18. The linear-motor-based system as claimed in claim 8, wherein at least one secondary-part winding is guided around at least one pole of the secondary part.

19. The linear-motor-based system as claimed in claim 8, further comprising a plurality of consecutive segments.

\* \* \* \* \*